(12) United States Patent
Kubo

(10) Patent No.: US 8,466,947 B2
(45) Date of Patent: Jun. 18, 2013

(54) LIGHT SOURCE DEVICE, OPTICAL SCANNING DEVICE, AND IMAGE FORMING APPARATUS

(75) Inventor: Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 446 days.

(21) Appl. No.: 12/548,719

(22) Filed: Aug. 27, 2009

(65) Prior Publication Data

US 2010/0060710 A1   Mar. 11, 2010

(30) Foreign Application Priority Data

Sep. 9, 2008   (JP) ................................ 2008-230383

(51) Int. Cl.
*B41J 2/45*   (2006.01)
*B41J 2/435*   (2006.01)
*B41J 27/00*   (2006.01)

(52) U.S. Cl.
USPC ........... 347/238; 347/245; 347/256; 347/257; 347/263

(58) Field of Classification Search
USPC .......................................................... 347/238
See application file for complete search history.

(56) References Cited

U.S. PATENT DOCUMENTS

| | | | |
|---|---|---|---|
| 4,495,515 A * | 1/1985 | Pamiello ........................ 257/717 |
| 4,907,124 A * | 3/1990 | Kaufman ........................ 361/722 |
| 5,432,537 A * | 7/1995 | Imakawa et al. ............... 347/135 |
| 6,376,837 B1 | 4/2002 | Itabashi et al. | |
| 6,995,885 B2 * | 2/2006 | Nakajima .................. 359/213.1 |
| 7,301,554 B2 | 11/2007 | Kubo | |
| 7,511,868 B2 | 3/2009 | Nakajima | |
| 7,545,547 B2 | 6/2009 | Hayashi et al. | |
| 7,561,318 B2 | 7/2009 | Nakajima | |
| 7,710,445 B2 * | 5/2010 | Amada et al. .................. 347/238 |
| 7,817,176 B2 * | 10/2010 | Masuda ........................ 347/241 |
| 7,916,374 B2 * | 3/2011 | Nakajima .................. 359/204.1 |
| 7,999,985 B2 * | 8/2011 | Miyake et al. ............. 359/197.1 |
| 8,169,457 B2 * | 5/2012 | Kubo et al. .................... 347/242 |
| 2004/0134113 A1 * | 7/2004 | Deros et al. ........................ 42/94 |
| 2006/0132880 A1 * | 6/2006 | Amada et al. ................. 359/196 |
| 2006/0209372 A1 * | 9/2006 | Tada ............................. 359/196 |
| 2007/0146738 A1 * | 6/2007 | Nakajima ...................... 358/1.4 |
| 2008/0123159 A1 | 5/2008 | Hayashi et al. | |
| 2008/0219601 A1 | 9/2008 | Arai et al. | |
| 2009/0052944 A1 | 2/2009 | Kubo et al. | |
| 2009/0060583 A1 | 3/2009 | Amada et al. | |

FOREIGN PATENT DOCUMENTS

| | | |
|---|---|---|
| JP | 2002-341273 | 11/2002 |
| JP | 2003-211728 | 7/2003 |
| JP | 2004-6592 | 1/2004 |
| JP | 2006-32584 | 2/2006 |
| JP | 2007-41333 | 2/2007 |
| JP | 2007-79295 | 3/2007 |
| JP | 2007156259 A * | 6/2007 |

* cited by examiner

*Primary Examiner* — Laura Martin
*Assistant Examiner* — Jeremy Bishop
(74) *Attorney, Agent, or Firm* — Dickstein Shapiro LLP

(57) ABSTRACT

A light source including a plurality of light emitting areas formed in a two-dimension array is mounted on a substrate. A holding member holds an optical system that shapes a laser beam emitted from each of the light emitting areas, a splitting element that splits a part of the laser beam passed through the optical system, and a light receiving system that receives split laser beam. A base member including an aligning unit that aligns the light source in a direction along an optical axis of the optical system and a direction perpendicular to the optical axis is connected to the holding member. An elastic member presses the substrate against the base member.

7 Claims, 9 Drawing Sheets

LIGHT SOURCE DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2008-230383 filed in Japan on Sep. 9, 2008.

BACKGROUND OF THE INVENTION

1. Field of the Invention

The present invention relates to a light source device, an optical scanning device, and an image forming apparatus, and more particularly, to a light source device that emits a laser beam, an optical scanning device that scans a scanning surface to be scanned, and an image forming apparatus that forms an image on a recording medium.

2. Description of the Related Art

One of known image forming apparatuses forming an image using a laser beam scans the surface of a rotating photosensitive drum with a laser beam to form a latent image thereon, develops the latent image with toner to obtain a toner image, and fixes the toner image onto a recording medium such as a paper sheet. Recently, this kind of image forming apparatus is widely used for simplified printing in an on-demand printing system, and there are increasing demands for higher density of an image and faster image output.

In response to such demands, Japanese Patent Application Laid-open No. 2003-211728, for example, suggests an image forming apparatus including a light source with a plurality of light emitting areas arranged monolithically in a two dimensional array, such as a vertical cavity surface emitting laser (VCSEL) array, and being able to scan a plurality of scanning lines on a scanning surface simultaneously using a plurality of laser beams emitted therefrom.

In such a light source having a VCSEL array, light emitting elements are mounted in a ceramic package having a lead frame, and is usually mounted on a substrate for use. The alignment of such a light source package with respect to optical systems is performed, for example, with reference to one of side surfaces of the ceramic package, as disclosed in Japanese Patent Application Laid-open No. 2004-6592.

According to the method disclosed in the Japanese Patent Application Laid-open No. 2004-6592, the ceramic package is pressed against a reference surface, using the elastic force generated by bending the substrate, to align the light source with respect to the optical systems. However, if the substrate is bent, solders on the substrate are likely to peel off, thus degrading reliability of the light source device. Furthermore, because the elastic force generated from the bent substrate greatly weakens over time, it is difficult to maintain the alignment of the light source and the optical system constant for a long time period.

SUMMARY

It is an object of the present invention to at least partially solve the problems in the conventional technology.

According to one aspect of the present invention, there is provided a light source device including a light source that includes a packaged light emitting element in which plural light emitting areas each emitting a laser beam in a predetermined axis direction are formed in a two-dimension array; a substrate on which the light source is mounted; an optical system that shapes the laser beam emitted from each of the light emitting areas; a splitting element that splits a part of the laser beam passed through the optical system; a light receiving system that receives the laser beam split by the splitting element; a holding member that holds the optical system, the splitting element, and the light receiving system; a base member that is connected to the holding member, which includes an aligning unit that aligns a position of the light source in a direction along an optical axis of the optical system and a direction perpendicular to the optical axis; and an elastic member that presses the substrate against the base member.

Furthermore, according to another aspect of the present invention, there is provided an optical scanning device that scans a scanning surface in a main scanning direction using a laser beam. The optical scanning device includes a light source device including a light source that includes a packaged light emitting element in which plural light emitting areas each emitting a laser beam in a predetermined axis direction are formed in a two-dimension array, a substrate on which the light source is mounted, an optical system that shapes the laser beam emitted from each of the light emitting areas, a splitting element that splits a part of the laser beam passed through the optical system, a light receiving system that receives the laser beam split by the splitting element, a holding member that holds the optical system, the splitting element, and the light receiving system, a base member that is connected to the holding member, which includes an aligning unit that aligns a position of the light source in a direction along an optical axis of the optical system and a direction perpendicular to the optical axis, and an elastic member that presses the substrate against the base member; and a scanning optical system that deflects laser beams emitted from the light source device to the main scanning direction for scanning.

Moreover, according to still another aspect of the present invention, there is provided an image forming apparatus that forms an image on a recording medium by fixing a toner image that is formed based on a latent image obtained from image information onto the recording medium. The image forming apparatus includes an optical scanning device that scans a scanning surface in a main scanning direction using a laser beam, which includes a light source device including a light source including a packaged light emitting element in which plural light emitting areas each emitting a laser beam in a predetermined axis direction are formed in a two-dimension array, a substrate on which the light source is mounted, an optical system that shapes the laser beam emitted from each of the light emitting areas, a splitting element that splits a part of the laser beam passed through the optical system, a light receiving system that receives the laser beam split by the splitting element, a holding member that holds the optical system, the splitting element, and the light receiving system, a base member that is connected to the holding member, which includes an aligning unit that aligns a position of the light source in a direction along an optical axis of the optical system and a direction perpendicular to the optical axis, and an elastic member that presses the substrate against the base member, and a scanning optical system that deflects laser beams emitted from the light source device to the main scanning direction for scanning; a photosensitive element on which the optical scanning device forms the latent image; a developing unit that develops the latent image formed on the photosensitive element with toner to obtain a toner image; and a transferring unit that transfers and fixes the toner image onto the recording medium.

The above and other objects, features, advantages and technical and industrial significance of this invention will be better understood by reading the following detailed descrip-

DETAILED DESCRIPTION OF THE PREFERRED EMBODIMENTS

Exemplary embodiments of the present invention will be explained in detail below with reference to the accompanying drawings.

Figure 1:
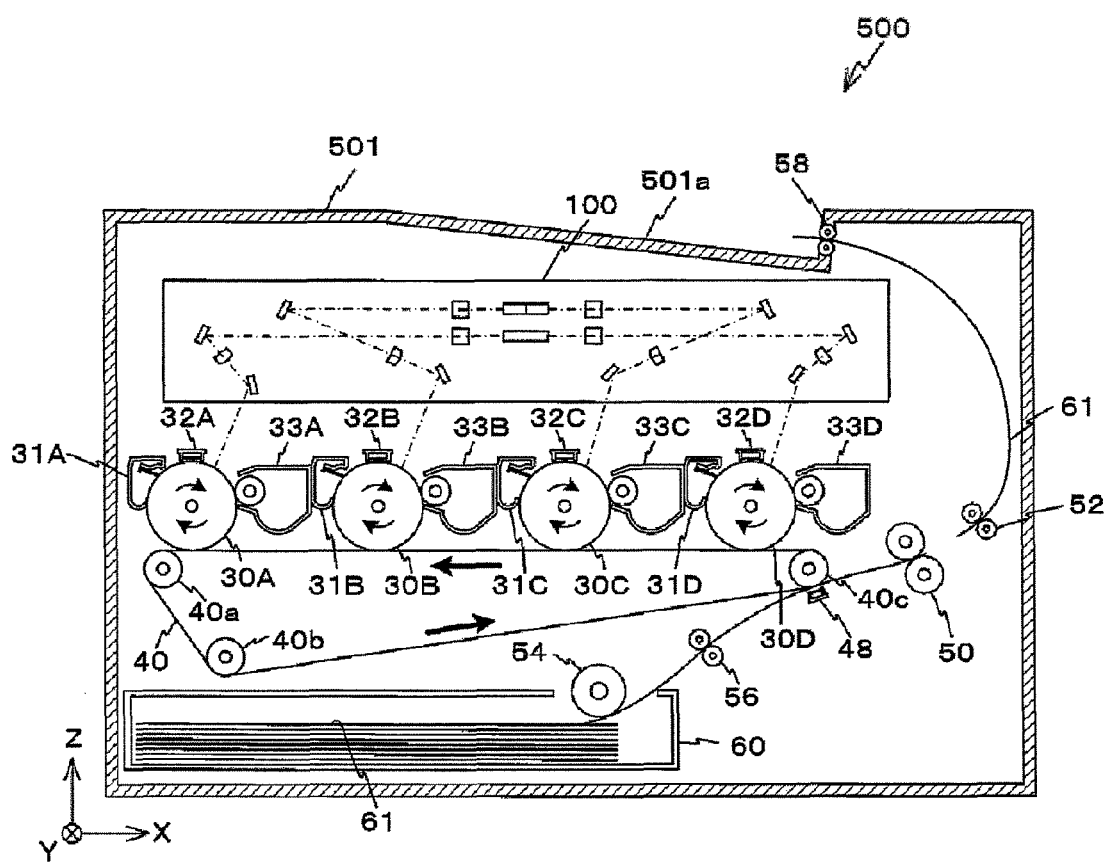
FIG. 1 is a schematic of a structure of an image forming apparatus 500 according to an embodiment of the present invention.

FIG. 1 is a schematic of a structure of an image forming apparatus 500 according to an embodiment of the present invention. The image forming apparatus 500 is, for example, a tandem-type color printer that prints a full color image on a standard paper sheet (paper sheet) by transferring black, yellow, magenta, and cyan toner images in a superimposing manner. As shown in FIG. 1, the image forming apparatus 500 includes an optical scanning device 100, four photosensitive drums 30A, 30B, 30C, and 30D, a transfer belt 40, a paper feeding tray 60, a paper feeding roller 54, first registration rollers 56, second registration rollers 52, fixing rollers 50, paper discharging rollers 58, a control device (not shown) for controlling overall each of these components, and a housing 501 for receiving each of these components.

A paper discharging tray 501a onto which printed paper sheets are discharged is formed on top of the housing 501. The optical scanning device 100 is arranged below the paper discharging tray 501a.

The optical scanning device 100 scans the photosensitive drum 30A with a laser beam of black component of an image that is modulated based on image information from an upper-level apparatus (e.g., personal computer), scans the photosensitive drum 30B with a laser beam of cyan component of the image, scans the photosensitive drum 30C with a laser beam of magenta component of the image, and scans the photosensitive drum 30D with a laser beam of yellow component of the image.

Each of the four photosensitive drums 30A, 30B, 30C, and 30D is a cylinder-shaped member having a photosensitive layer formed thereon. The photosensitive layer has a characteristic of becoming conductive at an area irradiated with a laser beam. The four photosensitive drums 30A, 30B, 30C, and 30D are disposed under the optical scanning device 100 with an equal space therebetween along the X-axis.

The photosensitive drum 30A is arranged longitudinally along the direction of the Y-axis, at the X-axis negative end in the housing 501. The photosensitive drum 30A is caused to rotate by a rotating mechanism, not shown, in the clockwise direction in FIG. 1 (the direction shown by the arrows in FIG. 1). An electrical charger 32A is disposed at the position of twelve o'clock around (on) the photosensitive drum 30A; a toner cartridge 33A is disposed at the position of two o'clock; and a cleaning case 31A is disposed at the position of ten o'clock.

The electrical charger 32A is disposed longitudinally along the Y-axis with a predetermined clearance with the surface of the photosensitive drum 30A. The electrical charger 32A charges the surface of the photosensitive drum 30A with a predetermined voltage.

The toner cartridge 33A includes a cartridge body filled with toner of the black component of an image, and developing rollers charged with a voltage having a polarity opposite to that of the photosensitive drum 30A. The toner cartridge 33A supplies the toner, filled in the cartridge body, to the surface of the photosensitive drum 30A via the developing rollers.

The cleaning case 31A includes a rectangular cleaning blade disposed longitudinally along the Y-axis. The cleaning case 31A is arranged so that an edge of the cleaning blade is brought in contact with the surface of the photosensitive drum 30A. The toner attached to the photosensitive drum 30A is peeled off by the cleaning blade while the photosensitive drum 30A is rotated, and collected inside the cleaning case 31A.

Each of the photosensitive drums 30B, 30C, and 30D has a structure equivalent to that of the photosensitive drum 30A, and is disposed sequentially, with a predetermined space therebetween, toward the X-axis positive side of the photosensitive drum 30A. Around each of the photosensitive drums 30B, 30C, and 30D, electrical chargers 32B, 32C, and 32D, toner cartridges 33B, 33C, and 33D, and cleaning cases 31B, 31C, and 31D are disposed respectively, in the same positional relationships as in the photosensitive drum 30A.

Each of the electrical chargers 32B to 32D has the same structure as the electrical charger 32A, and charges the surface of the photosensitive drums 30B to 30D with a predetermined voltage, respectively.

Each of the toner cartridges 33B to 33D includes a cartridge body filled with toner of cyan, magenta, or yellow component of the image, and developing rollers charged with a voltage at a polarity opposite to that of each of the photosensitive drums 30B to 30D. The toner cartridges 33B to 33D supply the toner, filled in the cartridge bodies, to the surfaces of the photosensitive drums 30B to 30D via the developing rollers.

The cleaning cases 31B to 31D have the same structure and function as those of the cleaning case 31A.

The photosensitive drum 30A, the electrical charger 32A, the toner cartridge 33A, and the cleaning case 31A are collectively referred to as a first station; the photosensitive drum 30B, the electrical charger 32B, the toner cartridge 33B, and the cleaning case 31B are collectively referred to as a second station; the photosensitive drum 30C, the electrical charger 32C, the toner cartridge 33C, and the cleaning case 31C are collectively referred to as a third station; and the photosensitive drum 30D, the electrical charger 32D, the toner cartridge 33D, and the cleaning case 31D are collectively referred to as a fourth station.

The transfer belt 40 is an endlessly moving member wound around driven rollers 40a and 40c, each disposed under the photosensitive drums 30A and 30D, respectively, and a driving roller 40b, disposed at a slightly lower level from the driven rollers 40a and 40c, so that the upper surface of the transfer belt 40 is brought in contact with the bottom surface of each of the photosensitive drums 30A, 30B, 30C, and 30D. The driving roller 40b is rotated in the counter-clockwise direction in FIG. 1 to rotate the transfer belt 40 in the counter-clockwise direction (the direction shown by the arrows in FIG. 1). Near the transfer belt 40 at the positive X-axis side end, a transfer charger 48 is disposed. The transfer charger 48 is applied with a voltage having a polarity opposite to those of the electrical chargers 32A, 32B, 32C, and 32D.

The paper feeding tray 60 is disposed under the transfer belt 40. The paper feeding tray 60 is a tray that is generally cuboid in shape, and receives therein a plurality of stacked paper sheets 61 that is to be printed. At the upper surface, near the positive X-axis side end, of the paper feeding tray 60, a rectangular opening is provided for supplying paper sheets.

The paper feeding roller 54 takes out each of the paper sheets 61 from the paper feeding tray 60 one by one, and guides the paper sheet into a gap between the transfer belt 40 and the transfer charger 48, through the first registration rollers 56 that are a pair of rotating rollers.

The fixing rollers 50 include a pair of rotating rollers. The fixing rollers 50 heat the paper sheet 61 while applying pressure thereto, and guide the paper sheet 61 to the paper discharging rollers 58 thorough the second registration roller 52.

The paper discharging rollers 58 include a pair of rotating rollers, and sequentially stack the guided paper sheet 61 onto the paper discharging tray 501a.

Figure 2:
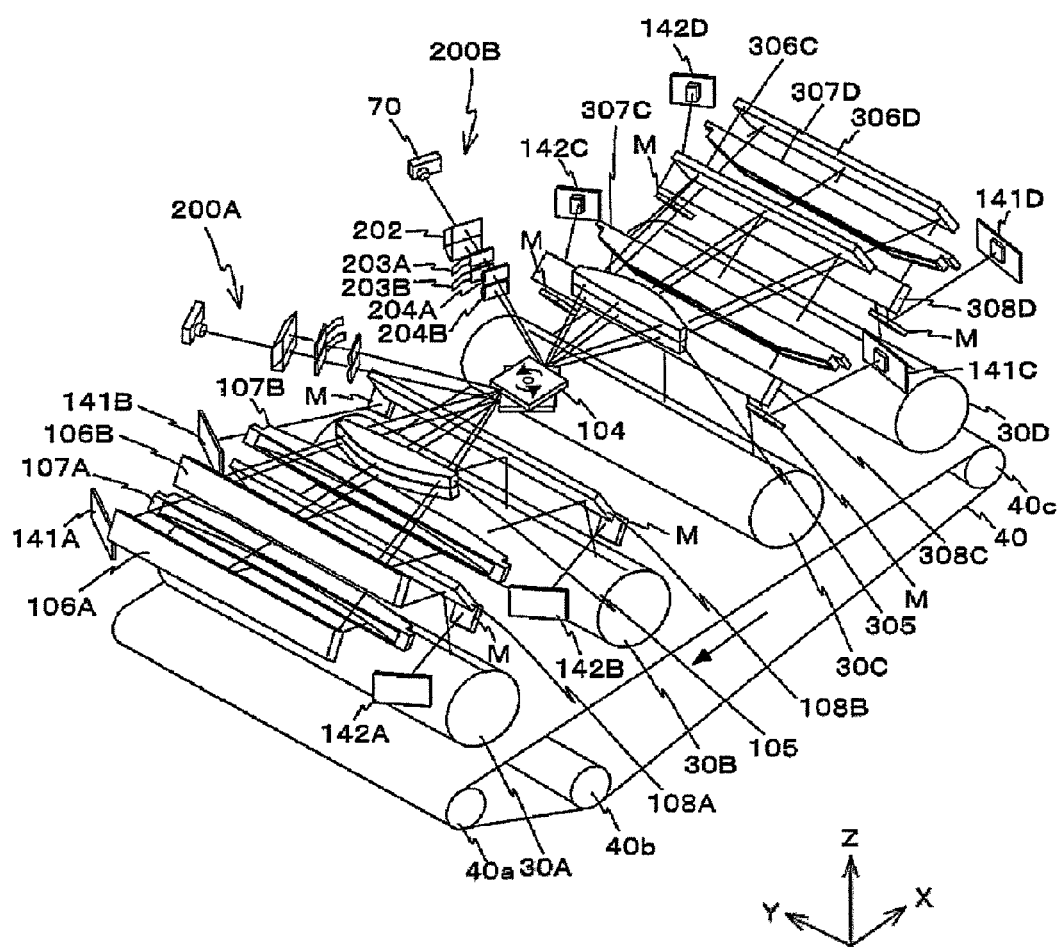
FIG. 2 is a perspective view of an optical scanning device 100 shown in FIG. 1.
Figure 3:
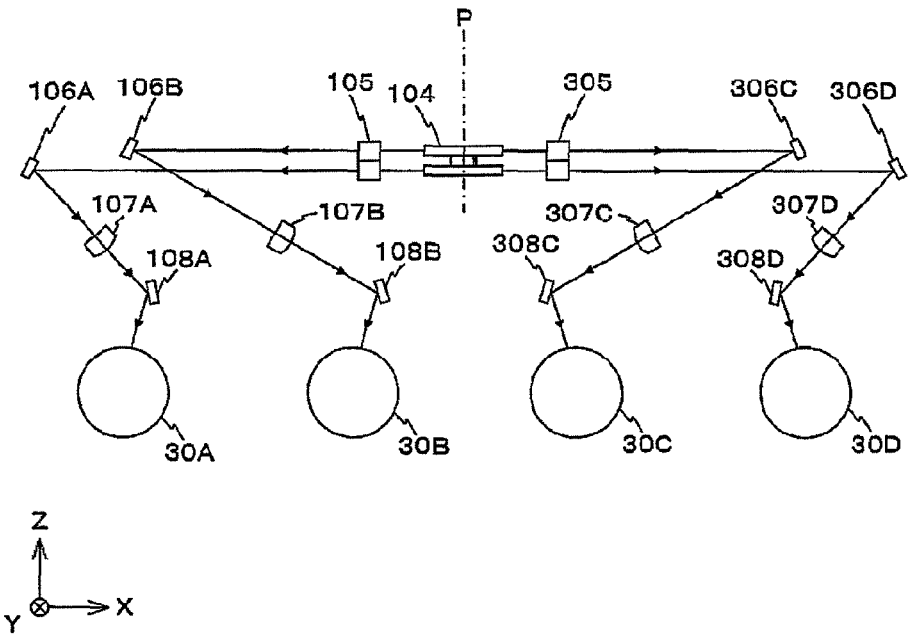
FIG. 3 is a side view of the optical scanning device 100 shown in FIG. 2.

A structure of the optical scanning device 100 will now be explained. FIG. 2 is a perspective view of the optical scanning device 100, and FIG. 3 is a side view of the optical scanning device 100. As one may generalize from the FIGS. 2 and 3, the optical scanning device 100 includes a scanning optical system, and two optical systems, optical systems 200A and 200B. The optical scanning device 100 further includes a polygon mirror 104; an fθ lens 105, a reflection mirror 106B, and a reflection mirror 106A each of which is arranged sequentially toward the negative direction on the X-axis with respect to the polygon mirror 104; a reflection mirror 108B disposed under the fθ lens 105; a toroidal lens 107B, a reflection mirror 108A, and a toroidal lens 107A that are sequentially arranged toward the negative direction on the X-axis with respect to the reflection mirror 108B; an fθ lens 305, a reflection mirror 306C, and a reflection mirror 306D arranged toward the positive direction on the X-axis with respect to the polygon mirror 104; a reflection mirror 308C arranged under the fθ lens 305; and a toroidal lens 307C, a reflection mirror 308D, and a toroidal lens 307D arranged sequentially toward the positive direction on the X-axis with respect to the reflection mirror 308C. The optical system 200A enables a laser beam for scanning the photosensitive drums 30A and 30B to be injected into the polygon mirror 104. The optical system 200B enables a laser beam for scanning the photosensitive drums 30C and 30D to be injected into the polygon mirror 104.

The optical systems 200A and 200B are optical systems that allow laser beams to be injected into deflection surfaces of the polygon mirror 104 in a direction 120 degrees or 60 degrees offset from the X-axis. As may be shown representatively in the optical system 200B in FIG. 2, such an optical system includes the light source device 70, a light flux splitting prism 202, a pair of liquid crystal elements 203A and 203B, and a pair of cylindrical lenses 204A and 204B that are arranged sequentially along the light path of the laser beam emitted from the light source device 70. For the convenience of explanation, an x-y-z coordinate system is defined herein by rotating the X-Y coordinates around the Z axis by 30 degrees, and this x-y-z coordinate system will be used in descriptions hereunder.

Figure 4:
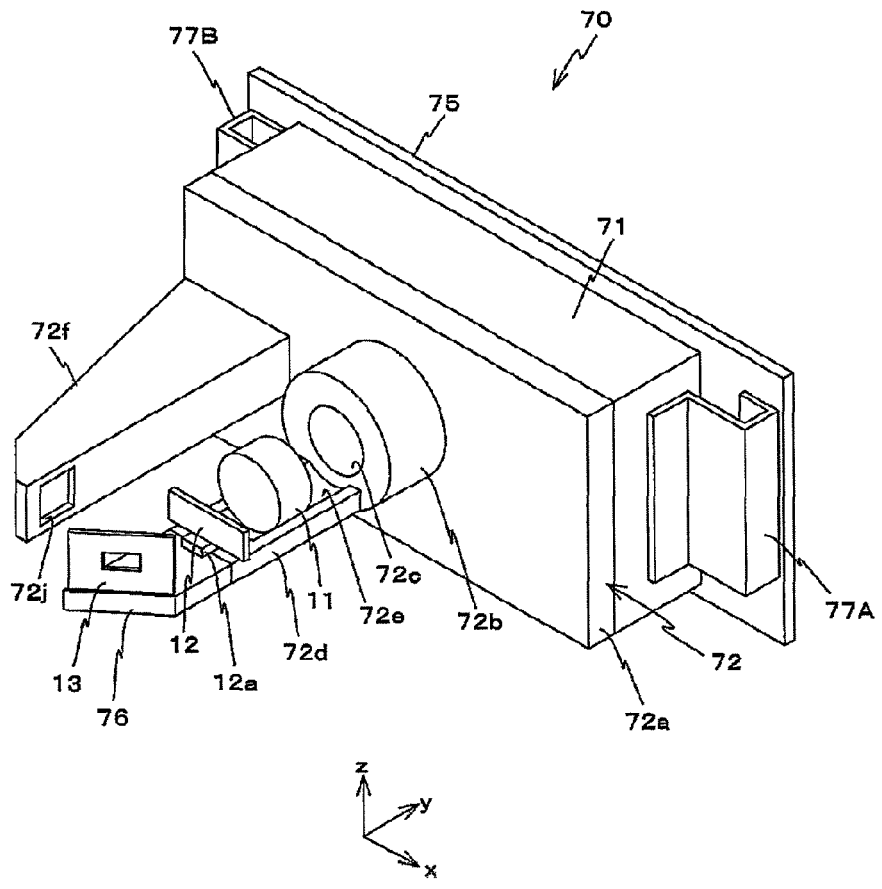
FIG. 4 is a perspective view of a light source device 70 shown in FIG. 2.

FIG. 4 is a perspective view of the light source device 70. As shown in FIG. 4, the light source device 70 includes: the substrate 75; the first holder 71; a pair of supporting members 77A and 77B for supporting the substrate 75 against the first holder 71; the second holder 72 fixed onto the first holder 71; a coupling lens 11 integrally held in the second holder 72; a temperature correcting lens 12; and a splitting optical element 13.

Figure 5:
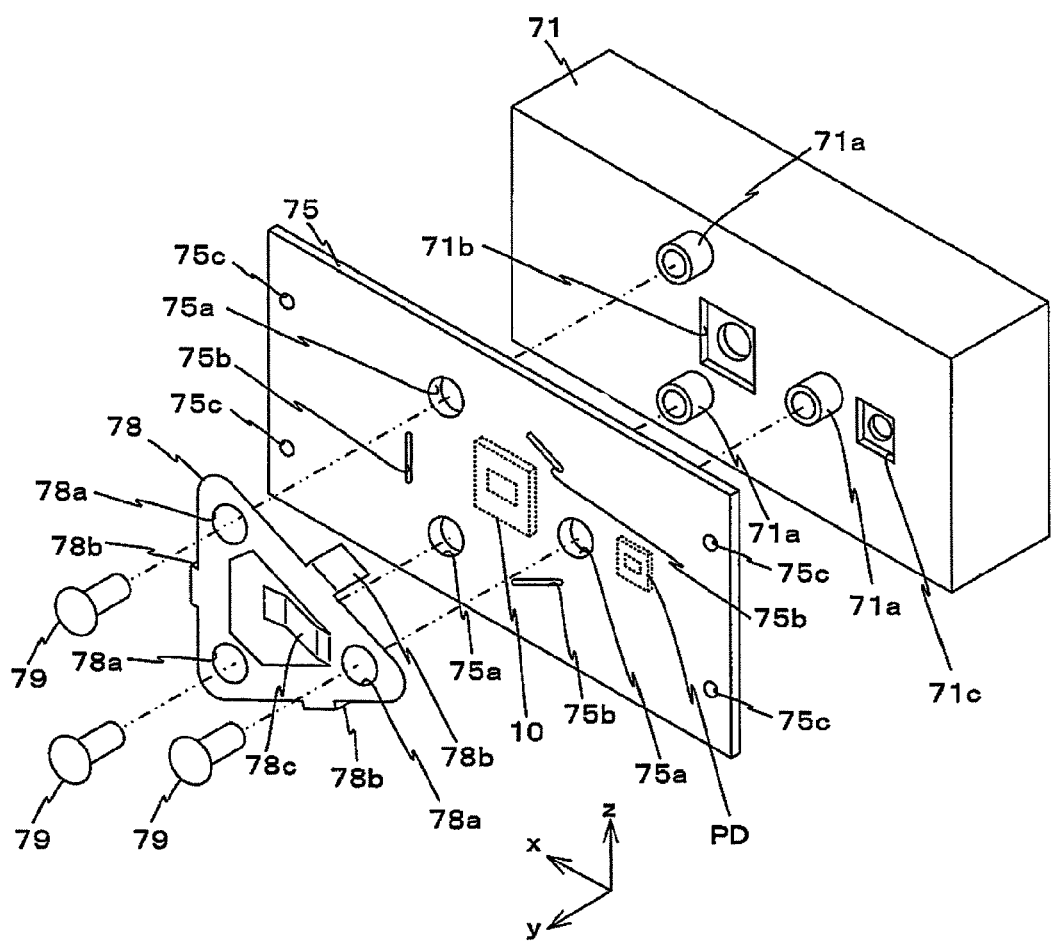
FIG. 5 is an exploded view of a substrate 75 and a first holder 71 shown in FIG. 4.

FIG. 5 is a schematic of the substrate 75 and the first holder 71 shown separated from each other. As shown in FIG. 5, the substrate 75 is a substrate made of glass epoxy with the longitudinal direction thereof laid along the X-axis. The light source 10 and a light receiving element photodiode (PD) for receiving a part of a laser beam emitted from the light source 10 are mounted on the surface of the substrate 75 on the Y-axis negative side. Elements such as a driving circuit for driving the light source 10 are formed on a surface of the substrate 75 on the Y-axis positive side. Three circular holes 75a and three slits 75b are formed surrounding the light source 10.

Figure 6A:
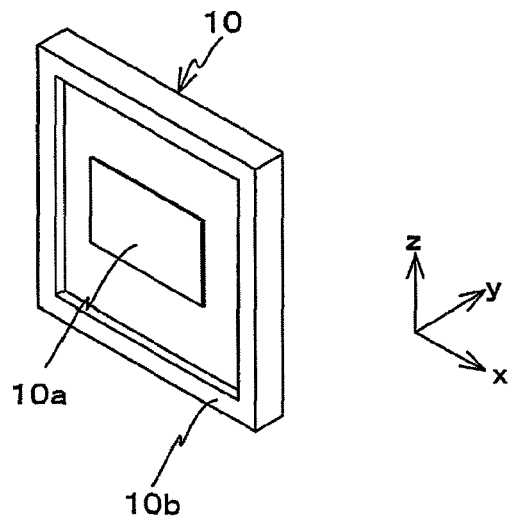
FIG. 6A is a perspective view of a light source 10 shown in FIG. 5.

FIG. 6A is a perspective view of the light source 10. As shown in FIG. 6A, the light source 10 is a VCSEL-type laser array including a square, plate-shaped package 10b, and the light emitting element 10a received in the package 10b.

The package 10b is made from a case, made of ceramic for example, having U-shaped cross sections along the x-y plane and the y-z plane, and a glass plate, having the same size as the case, pasted thereon from the Y-axis negative direction. Inert gas is filled inside of the package 10b.

Figure 6B:
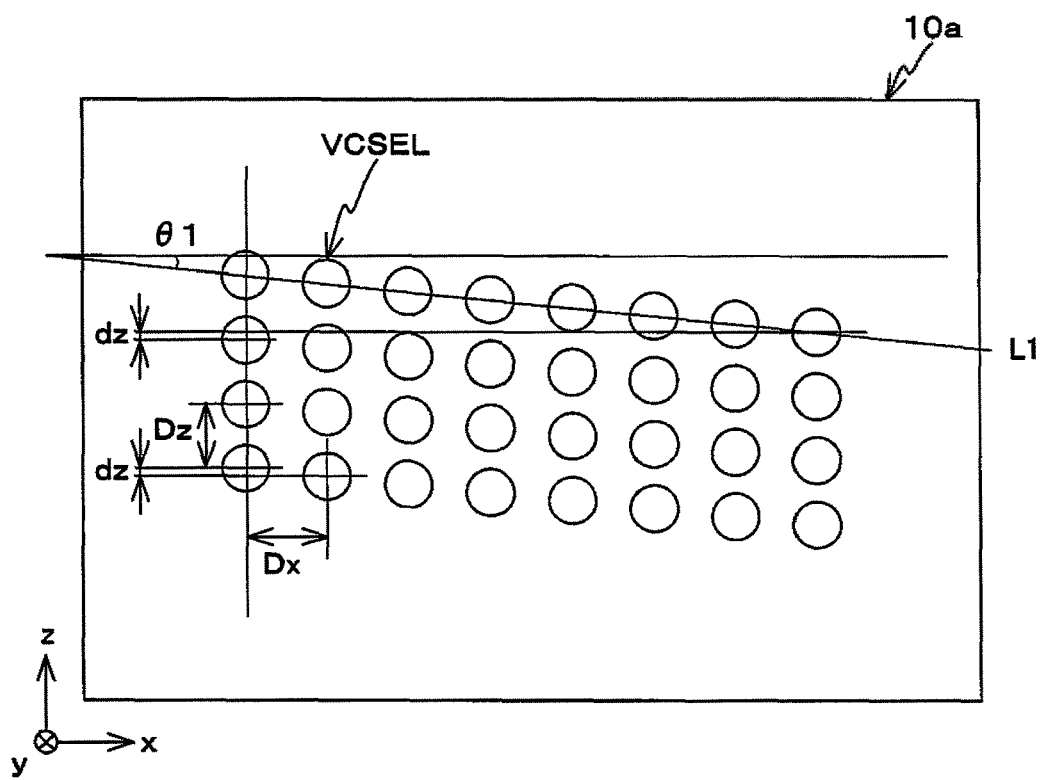
FIG. 6B is a plan view of a light emitting element 10a shown in FIG. 6A.

The light emitting element 10a is an element having a light emitting surface having a plurality of VCSELs arranged two-dimensionally. As shown in FIG. 6B, on the light emitting surface of the light emitting element 10a (the surface located at the Y-axis negative direction), thirty two VCSELs, emitting diverging light toward the Y-axis negative direction, are arranged in a matrix having four rows and eight columns. The row herein a direction parallel to a line L1 that is offset from the X-axis by an angle θ1, and the column herein is a direction parallel to the z axis. According to the embodiment, as an example, a pitch Dz between the VCSELs in the sub-scanning direction is 18.4 micrometers, and a pitch Dx in the main scanning direction is 30 micrometers. A pitch dz between each of the light sources of the VCSELs neighboring in the z-axis direction (sub-scanning direction) is 2.3 micrometers (=Dz/8). The light emitting element 10a is received in the package 10b, with the light emitting surface thereof disposed in parallel with the Y-axis negative side surface of the package 10b.

Figure 7:
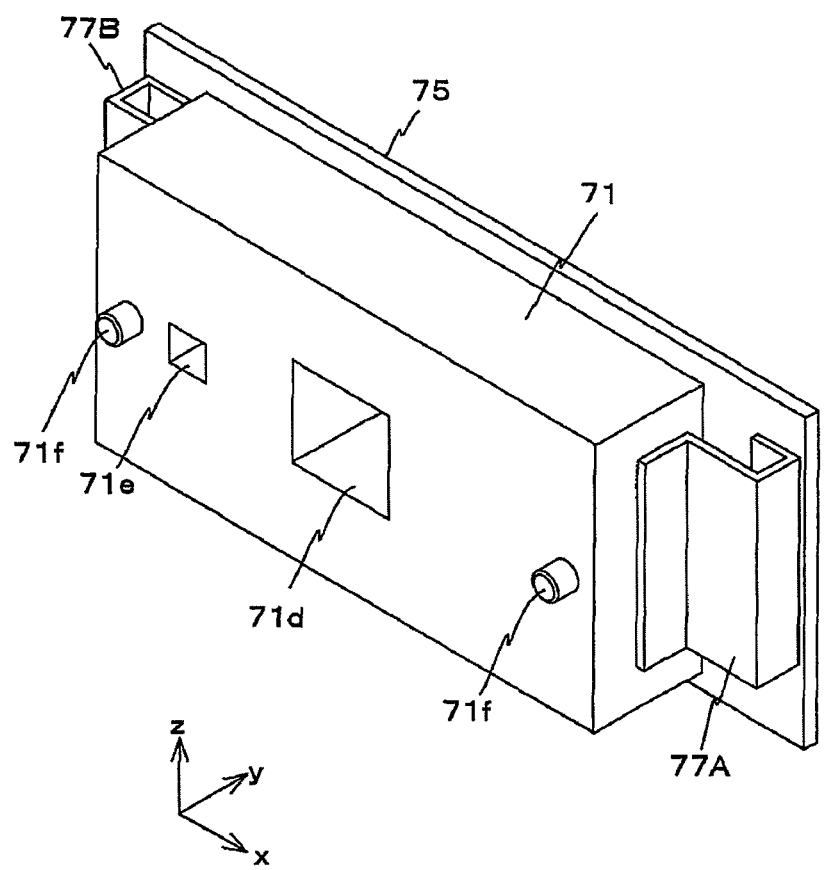
FIG. 7 is a perspective view of the substrate 75 and the first holder 71, shown in FIG. 5, joined together.

FIG. 7 is a perspective view of the first holder 71 shown with the substrate 75 and so on. As one may generalize from FIGS. 7 and 5, the first holder 71 is a cuboid-shaped member made of aluminum, and laid longitudinally along the X-axis. On the Y-axis positive side surface of the first holder 71, a rectangular recess 71b, a recess 71c, and tubular members 71a are formed. The light source 10 mounted on the substrate 75 fits into the recess 71b, and the light receiving element PD fits into the recess 71c. The tubular members 71a are provided surrounding the recess 71b, and respectively inserted into the three circular holes 75a on the substrate 75.

On the Y-axis negative side surface of the first holder 71, cylinder-shaped protrusions 71f, protruding toward the Y-axis negative direction, are respectively formed on the X-axis positive and negative ends thereof. Between these two protrusions 71f, a square-shaped recess 71d and a recess 71e are formed. These recesses 71d and 71e are communicatively connected to the recesses 71b and 71c that are formed on the Y-axis negative side thereof thorough circular openings.

The pair of supporting members 77A and 77B are members formed by bending metal sheets, and includes a surface parallel to the y-z plane, and another surface parallel to the x-z plane.

As it may be comprehended by contemplating on FIG. 5, the substrate 75 and the first holder 71 are assembled with the light source 10 and the light receiving element PD, each mounted on the substrate 75, respectively fitting into the recesses 71b and 71c formed on the first holder 71, and the three tubular members 71a formed on the first holder 71 inserted into the three circular holes 75a formed on the substrate 75. An energizing member 78, generally triangular in shape, is mounted to the tubular members 71a of the first holder 71.

The energizing member 78 is formed by, for example, providing a sheet-metal processing to an elastic, plate-like member. The energizing member 78 has three anchors 78b that can respectively be inserted into the three slits 75b formed on the substrate 75, and a pressing element 78c that applies an elastic force toward the Y-axis negative direction. The anchors 78b are respectively inserted into the slits 75b formed on the substrate 75, and screws 79 are screwed into the tubular members 71a on the first holder 71 through circular holes 78a formed at each corner of the energizing member 78, to fix the energizing member 78 against the first holder 71. In this manner, the substrate 75 is energized in the direction moving closer to the first holder 71 by way of the pressing element 78c provided on the energizing member 78. The Y-axis negative side of the light source 10 abuts the bottom wall of the recess 71b formed on the first holder 71, aligning the light source 10 with respect to the first holder 71.

In this arrangement, as shown in FIG. 7, the planes parallel to the y-z plane of the pair of supporting members 77A and 77B are fixed on the X-axis positive side and the X-axis negative side of the first holder 71, and the planes parallel to the x-z plane is fixed on the Y-axis negative side of the substrate 75, to support the substrate 75 with respect to the first holder 71. In this manner, relative positions between the first holder 71 and the substrate 75 are stably maintained.

Figure 8A:
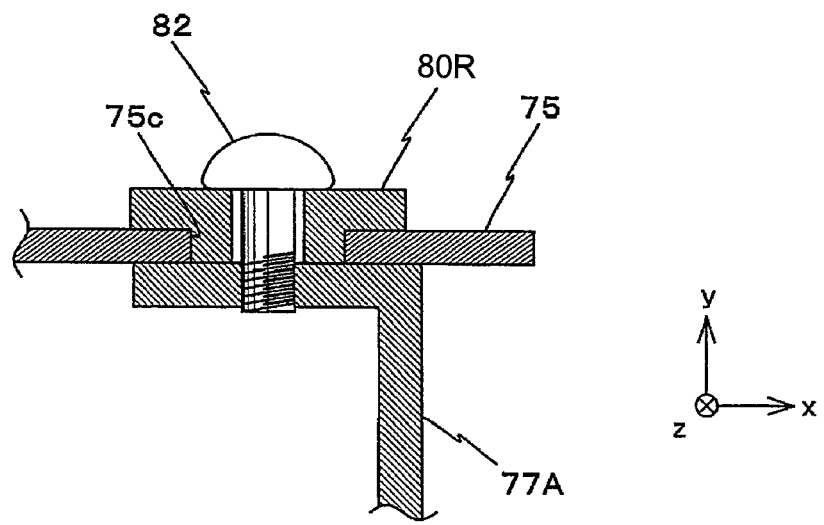
FIG. 8A is an enlarged view of a joint between a supporting member 77A and the substrate 75.
Figure 8B:
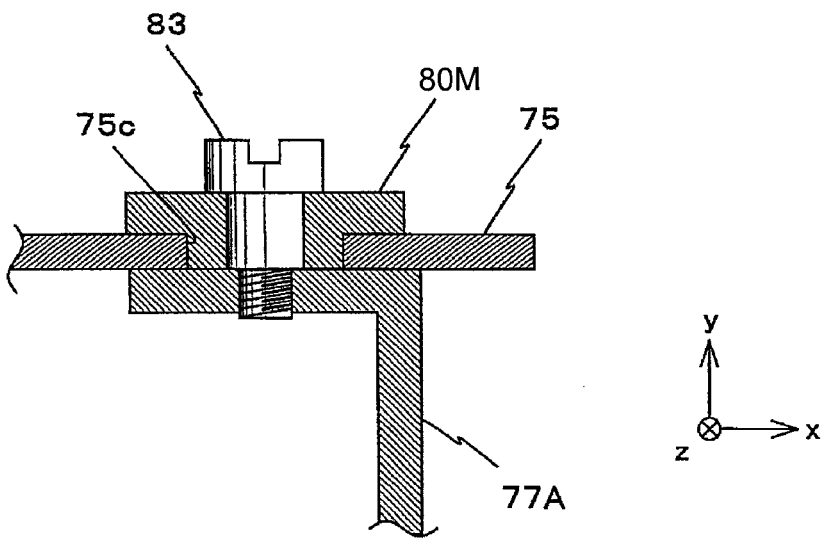
FIG. 8B is another enlarged view of where the supporting member 77A is connected to the substrate 75.

Furthermore, according to the embodiment, the supporting member 77A and the substrate 75 are fixed by using two types of screws 82 and 83. FIGS. 8A and 8B are enlarged views of the area where the supporting member 77A and the substrate 75 are joined. The screw 82 is a screw having a cylinder-shaped thread element with a groove formed at the tip thereof as shown in FIG. 8A. The screw 83 is a screw having a thread element including two portions, a large-diameter portion, and a small-diameter portion with a groove formed thereon. The supporting members 77A and the substrate 75 are fixed together by engaging a stepped annular member 80R, 80M into each of two circular openings 75c formed on the X-axis positive side end of the substrate 75, and then screwing the tips of the screws 82 and 83, inserted into the circular openings 75c, into the supporting members 77A, respectively.

In the same manner, the supporting member 77B and the substrate 75 are fixed together using two screws 82, after fitting the stepped annular member 80R into the circular openings 75c formed on the X-axis negative end of the substrate 75, and screwing the tips of the screws 82 into the supporting member 77B, respectively, through each of the circular openings 75c.

Furthermore, according to the embodiment, the outer diameter of the large-diameter portion of the thread formed on the screw 83 is approximately the same as the inner diameter of the annular member 80M. The outer diameter of the thread of the screw 82 is slightly smaller than the inner diameter of the annular member 80R. In this manner, the position of the substrate 75 is defined on the x-z plane with reference to the circular opening 75c into which the screw 83 is inserted. At the same time, a space (allowance) is formed between the annular member 80R and the screw 82 so as to allow expansion and elongation of the substrate 75.

Referring back to FIG. 4, the second holder 72 includes four elements: a plate-like body 72a having a circular opening 72c formed at the center thereof; an annular protrusion 72b formed on the Y-axis negative side of the body 72a, surrounding the circular opening 72c; a projecting element 72d projecting at the bottom of the annular protrusion 72b toward the Y-axis negative direction; and a light receiving system supporting portion 72f formed at the X-axis negative side of the projecting element 72d and longitudinally along the Y-axis.

A recess 72e, curving with its generatrix along the Y-axis, is provided on the top surface of the projecting element 72d. The light receiving system supporting portion 72f is hollow inside, and formed so that the size thereof in the X-axis direction become increased from the Y-axis negative end toward the Y-axis positive side end. The light receiving system supporting portion 72f also has an opening 72j into which a laser beam reflected on the splitting optical element 13 is injected on the X-axis positive side thereof. A reflection mirror 14 and a condenser lens 15 are held inside the light receiving system supporting portion 72f.

The coupling lens 11 is disposed on the upper surface of the projecting element 72d included in the second holder 72. The coupling lens 11 is a lens having a refractive index of approximately 1.5, and having a focus thereof toward the Y-axis negative side. The coupling lens 11 shapes the injected laser beam into generally parallel light by modifying the divergent angle thereof.

The temperature correcting lens 12 is longitudinally disposed along the X-axis on top of the projecting element 72d at the Y-axis negative end thereof, having a third holder 12a therebetween. The temperature correcting lens 12 is made of transparent resin, and is a rectangular, plate-like resin lens laid longitudinally along the X-axis. The optical properties of the temperature correcting lens 12 are caused to change so as to correct the variations of the optical properties of the light source device 70. Such variations occur, for example, when the distance between the coupling lens 11 and the light source 10 become varied slightly due to the temperature variation in the light source device 70.

The splitting optical element 13 is a plate-like member having at a center a rectangular opening longitudinally laid in the X-axis direction, and on the Y-axis positive side thereof, a reflective surface for reflecting a laser beam is provided. The center of the opening in the splitting optical element 13 is located at or near the focal point of the coupling lens 11. The splitting optical element 13 is supported on a fourth holder 76, fixed on the Y-axis negative end of the projecting element 72d, with the reflective surface thereof inclined by 45 degrees with respect to the z-x plane.

Figure 9:
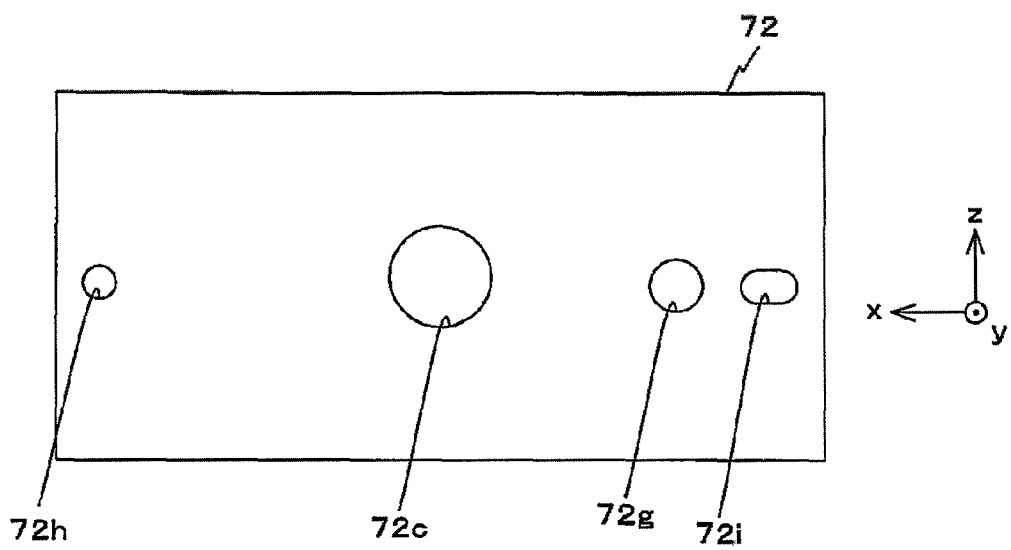
FIG. 9 is a plan view of a second holder 72 shown in FIG. 4.

Furthermore, as shown in FIG. 9, an opening 72g, a circular recess 72h, and an oval recess 72i are formed on the Y-axis positive side surface of the second holder 72. The opening 72g is arranged on the X-axis negative side of the circular opening 72c, and connected to the inside of the light receiving system supporting portion 72f. The circular recess 72h and the oval recess 72i are provided at positions respectively corresponding to a pair of the protrusions 71f on the first holder 71, and the oval recess 72i is laid longitudinally along the X-axis direction. The second holder 72 is fixed onto the first holder 71 by way of screws, for example, with a pair of protrusions 71f, formed on the first holder 71, inserted in the recesses 72h and 72i.

Figure 10:
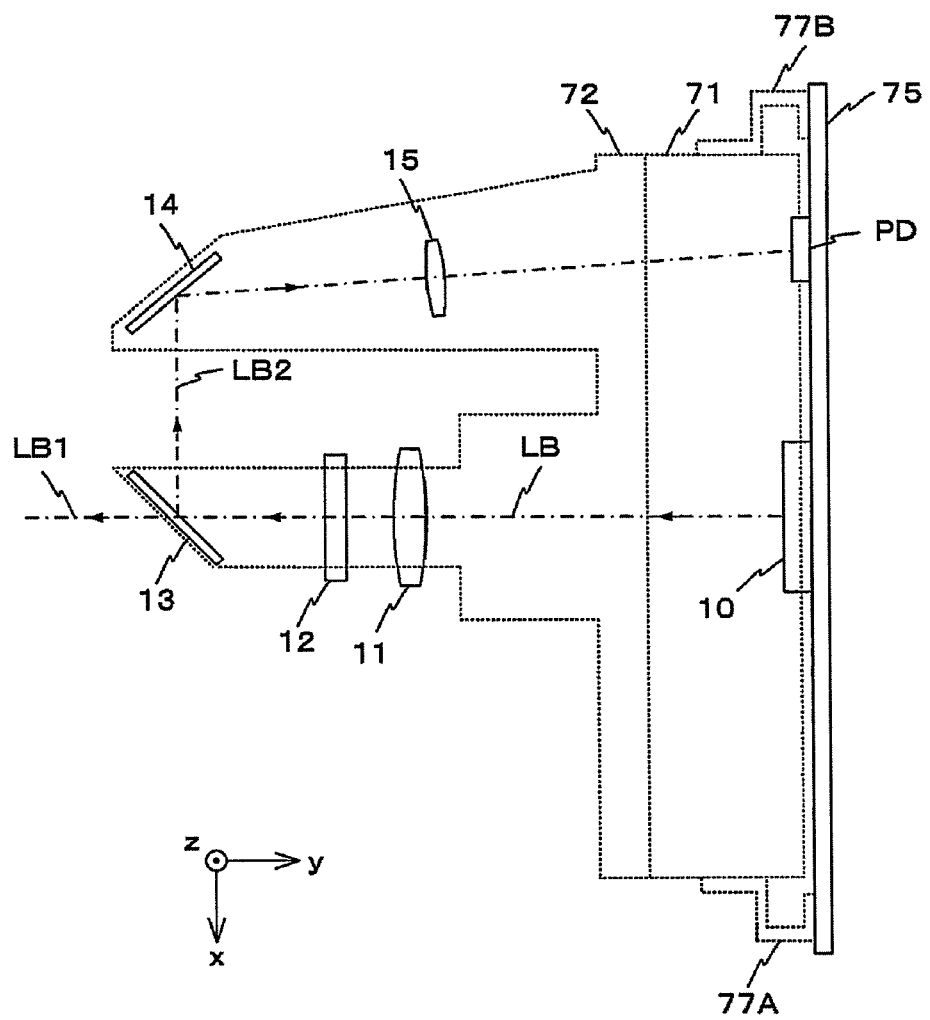
FIG. 10 is a schematic of a layout of optical elements included in the light source device 70 shown in FIG. 4.

FIG. 10 is a schematic of a layout of optical elements included in the light source device 70. In the light source device 70, including an assembly of the substrate 75, the first holder 71, a pair of the supporting members 77A and 77B, the second holder 72, and so on as described above, the laser beam LB emitted from the light source 10 passes through the coupling lens 11 so that the light flux thereof is shaped into generally parallel light. The laser beam LB that has passed through the coupling lens 11 is split into a scanning laser beam LB1 and a monitoring laser beam LB2, by the light flux passing through the opening in the splitting optical element 13 (the scanning laser beam LB1) and the light flux being reflected to the X-axis negative direction on the reflective surface of the splitting optical element 13 (the monitoring laser beam LB2). The scanning laser beam LB1 is injected to the polygon mirror 104, and the monitoring laser beam LB2 is collected onto the light receiving element PD through the recesses 71e and 71c formed on the first holder 71 by way of the reflection mirror 14 and the condenser lens 15.

The light source device 70 having such a structure is mounted movably around an axis parallel to the optical axis of the coupling lens 11 in an optical housing included in the optical scanning device 100.

Referring back to FIG. 2, the light flux splitting prism 202 splits the injected laser beam into two laser beams separated by a predetermined distance vertical direction (in the sub-scanning direction).

The liquid crystal elements 203A and 203B are disposed vertically adjacent to each other, correspondingly to each of the two laser beams split by the light flux splitting prism 202, and deflect the laser beams in the sub-scanning direction in accordance to a voltage signal received from a control device (not shown).

The cylindrical lenses 204A and 204B are disposed vertically adjacent to each other, correspondingly to each of the two laser beams split by the light flux splitting prism 202, and collect the injected laser beams to the polygon mirror 104. These cylindrical lenses 204A and 204B at least have a positive curvature in the sub-scanning direction, and, together with the toroidal lenses 107A, 107B, 307C, and 307D to be described later, create an optical face tangle error correcting system having a conjugate relation with the deflecting surfaces of the polygon mirror 104 and each surface of the photosensitive drums 30A to 30D.

The polygon mirror 104 is made of a pair of regular tetragon cylinder members, each having laser beam deflection surfaces on lateral sides thereof. Each of these members is arranged vertically adjacent to each other, with the phase of one of the members 45 degrees offset from the other. The polygon mirror 104 is rotated at a constant angular rate in the direction shown with the arrows in FIG. 2 by way of a rotating mechanism not shown. In this manner, the two beams, split into two by the light flux splitting prism 202 in the optical system 200A or the optical system 200B and respectively collected to the deflection surface of the polygon mirror 104, are deflected on the deflection surface at different phase, and injected to the photosensitive drums in an alternating manner.

The fθ lenses 105 and 305 have image heights in proportion to an incident angle of the laser beam, and cause an image plane of the laser beam, deflected on the polygon mirror 104 deflecting at a constant angle speed, to move at a constant speed with respect to the Y-axis.

Each of the reflection mirrors 106A, 106B, 306C, and 306D is arranged longitudinally along the Y-axis. The reflection mirrors 106A, 106B, 306C, and 306D reflect the laser beams that pass through the fθ lenses 105 and 305 to inject the laser beams to each of the toroidal lenses 107A, 107B, 307C, and 307D.

Each toroidal lens 107A, 107B, 307C, and 307D is arranged longitudinally along the Y-axis, and focuses each of the laser beams, respectively reflected on the reflection mirror 106A, 106B, 306C, and 306D, to the surface of each of the photosensitive drums 30A, 30B, 30C, and 30D through the reflection mirrors 108A, 108B, 308C, and 308D each of which arranged longitudinally along the Y-axis.

Optical detection sensors 141A and 141B are arranged near the Y-axis positive side end of the toroidal lenses 107A and 107B (the side from which the laser beam is injected), and optical detection sensors 141C and 141D are arranged near the Y-axis negative side end of the toroidal lenses 307C and 307D (the side from which the laser beam is injected). Furthermore, optical detection sensors 142A and 142B are arranged near the Y-axis negative side end of the toroidal lenses 107A and 107B, and optical detection sensors 142C and 142D are arranged near the Y-axis positive side end of the toroidal lenses 307C and 307D. These optical detection sensors 141A to 141D and 142A to 142D output a signal that turns ON while a laser beam is injected, and turns OFF during the remaining time.

An operation of the image forming apparatus 500 including the optical scanning device 100 having the structure as described above will now be explained. When image information is supplied from an upper-level apparatus, a laser beam is emitted from the light source device 70 in the optical system 200A, and vertically split into two by way of the light flux splitting prism 202. Each of the split laser beams passes through the liquid crystal elements 203A and 203B to have the positions thereof corrected in the sub-scanning direction, and collected on the deflection surface of the polygon mirror 104 by way of the cylindrical lenses 204A and 204B. The laser beams deflected on the polygon mirror 104 are injected to the fθ lens 105.

An upper laser beam injected into the fθ lens 105 is reflected on the reflection mirror 106B, and injected into the toroidal lens 107B. The laser beam is then collected on the surface of the photosensitive drum 30B by way of the toroidal lens 107B via the reflection mirror 108B. A lower laser beam injected into the fθ lens 105 is reflected on the reflection mirror 106A, and injected into the toroidal lens 107A. The laser beam is then collected on the surface of the photosensitive drum 30A by way of the toroidal lens 107A via the reflection mirror 108A. The phase of the upper and lower deflection surfaces of the polygon mirror 104 is shifted by 45 degrees, as already mentioned above. Therefore, the upper and the lower beams scan the photosensitive drum 30B and the photosensitive drum 30A, respectively in an alternating manner, along the Y-axis negative direction based on signals output from each of the optical detection sensors 141A, 141B, 142A, and 142B.

A laser beam is emitted from the light source device 70 in the optical system 200B, and vertically split into two by way of the light flux splitting prism 202. Each of the split laser beams passes through the liquid crystal elements 203A and 203B to have the positions thereof corrected in the sub-scanning direction, and collected on the deflection surface of the polygon mirror 104 by way of the cylindrical lenses 204A and 204B. The laser beams deflected on the polygon mirror 104 is injected to the fθ lens 305.

An upper laser beam injected into the fθ lens 305 is reflected on the reflection mirror 306C, and injected into the toroidal lens 307C. The laser beam is then collected on the surface of the photosensitive drum 30C by way of the toroidal lens 307C via the reflection mirror 308C. A lower laser beam injected into the fθ lens 305 is reflected on the reflection mirror 306D, and injected into the toroidal lens 307D. The laser beam is then collected on the surface of the photosensitive drum 30D by way of the toroidal lens 307D via the reflection mirror 308D. The phase of the upper and lower deflection surfaces of the polygon mirror 104 is shifted by 45 degrees, as already mentioned above. Therefore, the upper and the lower beams scan the photosensitive drum 30C and the photosensitive drum 30D, respectively in an alternating manner, along the Y-axis positive direction based on signals output from each of the optical detection sensors 141C, 141D, 142C, and 142D.

Furthermore, in the light source device 70, as shown in FIG. 10, the monitoring laser LB2 emitted from the light source 10 and reflected on the reflection surface of the splitting optical element 13 is injected into the light receiving element PD. The light source device 70 constantly monitors a signal output while the laser beam is injected into the light receiving element PD to control the light intensity of the laser beam emitted from the light source 10.

More specifically, the monitoring laser LB2 is received at the light receiving element PD after being deflected on the deflection surface of the polygon mirror 104 before reaching to a written area of the photosensitive drum. The light source device 70 detects the intensity of the laser beam emitted from the light source 10 based on a photoelectrically-converted signal output from the light receiving element PD when the monitoring laser LB2 is received thereon, and sets (determines) a value of an injected power to be supplied to each of the VCSELs so that the intensity is adjusted to a preset value. In this manner, when the laser beam is injected to the written areas of the photosensitive drums 30A to 30D, the intensity of the laser beam is adjusted to a preset value.

The photosensitive layer on the surface of each of the photosensitive drums 30A, 30B, 30C, and 30D is charged at a predetermined voltage by way of the electrical chargers 32A, 32B, 32C, and 32D, respectively. Therefore, the electrical charge is distributed thereon in a certain charge density. When each of the photosensitive drums 30A, 30B, 30C, and 30D is scanned in the manner described above, the photosensitive layer becomes conductive at an area at which the laser beam is focused, and the electrical potential thereon becomes approximately zero. Therefore, when the photosensitive drums 30A, 30B, 30C, and 30D, each rotating in the direction shown in the arrows in FIG. 1, are scanned by the laser beam modulated according to image information, an electrostatic latent image, defined by the distribution of the electrical charge, is formed on the surface of each of the photosensitive drums 30A, 30B, 30C, and 30D.

When an electrostatic image is formed on the surface of each of the photosensitive drums 30A, 30B, 30C, and 30D, the developing rollers in the toner cartridges 33A, 33B, 33C, and 33D shown in FIG. 1 supply the toner on the surface of each of the photosensitive drums 30A, 30B, 30C, and 30D. At this time, because the developing roller in each of the toner cartridges 33A, 33B, 33C, and 33D is charged to a voltage of a polarity opposite to that of the photosensitive drums 30A, 30B, 30C, and 30D, the toner attached to the developing rollers is charged to the same polarity as that on the photosensitive drums 30A, 30B, 30C, and 30D. Therefore, the toner will not attach to the surfaces of the photosensitive drums 30A, 30B, 30C, and 30D in an area where there is a distribution of the electrical charge, and the toner is attached only to a scanned area of the surface. In this manner, the toner image that is a visualized electrostatic latent image is formed on the surface of the photosensitive drums 30A, 30B, 30C, and 30D.

As described above, the toner images, each formed in the first station, the second station, the third station, and the fourth station based on the image information, are transferred onto the surface of the transfer belt 40, overlapped with each other; further transferred onto the surface of the paper sheet 61 that is taken out from the paper feeding tray 60 by way of the transfer charger 48; and fixed thereon by way of the fixing rollers 50. The paper sheet 61 on which the image is formed in the manner described above is discharged onto the paper discharging tray 501a by way of the paper discharging rollers 58, and sequentially stacked thereon.

As explained above, in the light source device 70 according to the embodiment, the second holder 72 that holds the coupling lens 11, the temperature correcting lens 12, the splitting optical element 13, the reflection mirror 14, and the condenser lens 15 is attached to the first holder 71. The first holder 71 and the substrate 75 are joined together using the supporting members 77A and 77B with the light source 10 fitting in the recess 71b formed on the first holder 71, to support the substrate 75 with respect to the first holder 71. In this manner, the positions of the light source 10 and each of the elements held on the second holder 72 are accurately defined, and further stably maintained.

According to the embodiment, the first holder 71 is made of aluminum; the supporting members 77A and 77B are made of iron; and the substrate 75 is made of glass epoxy resin. Because these members have different linear expansion coefficients, thus expanding and contracting in different degrees upon being exposed to changing ambient temperature, if these members are joined by screws, each of the members can get deformed, e.g., become warped. The linear expansion coefficient is small in the order of aluminum, iron, and glass epoxy resin. It has been confirmed by a simulation that, when each of these members is joined by screws without using the annular member 80R, 80M, the substrate is warped in an order of several-tens of microns within the operation temperature variation. Such warpage of the substrate could lead to positional variations in the light emission point, and can become a factor of deteriorating an image quality.

Furthermore, according to the embodiment, the supporting member 77A and the substrate 75 are fixed together using two types of the screws 82 and 83. The supporting member 77B and the substrate 75 are fixed together using two of the screws 82. The outer diameter of the large diameter portion of the thread formed on the screw 83 is almost the same in size as the inner diameter of the annular member 80M, and the outer diameter of the thread on the screw 82 is slightly smaller than the inner diameter of the annular member 80R. By way of these structures, the position of the substrate 75 on the x-z plane is defined with reference to the screw 83, and a space (allowance) is formed between the annular member 80R and the screw 82 so that thermal expansion of the substrate 75 is allowed. Therefore, even if the substrate 75 expands or contracts due to temperature change, the substrate 75 is not exposed to a stress, thus preventing the substrate 75 from being bent. According to the embodiment, it is preferable that the annular member 80M into which the screw 83 is inserted is made of metal; the annular member 80R into which the screw 82 is inserted is made of resin having a low friction coefficient, e.g. Teflon (registered trademark) having a friction coefficient of approximately 0.05.

Moreover, according to the embodiment, because only the small-diameter portion is screwed into the substrate 75, the annular member 80M is prevented from being exposed to an excessive force upon tightening the screw 83, as well as the screw can be prevented from loosening due to a change in ambient temperature. Furthermore, according to the embodiment, the substrate 75 and the supporting members 77A and 77B are fixed together using two types of the screws 82 and 83; however, the present invention is not limited thereto, and the substrate 75 and the supporting members 77A and 77B may be fixed together using only the screws 83 or only the screws 82.

Furthermore, in the optical scanning device 100 according to the present invention, the light source device 70 is movably disposed around the optical axis of the coupling lens 11. Therefore, the pitch of the laser beams, collected on the photosensitive drums, in the sub-scanning direction can be adjusted precisely by moving the light source device 70 rotationally, so that a predetermined pitch can be obtained.

Moreover, in the image forming apparatus 500 according to the present invention, a final image is formed based on the latent image formed by the optical scanning device 100. Therefore, a highly precise image can be formed on the paper sheet 61.

Furthermore, according to the embodiment, the image forming apparatus 500 is described to include a plurality of the photosensitive drums 30A to 30D, and to form a multi-colored image; however, the present invention is not limited thereto, and may be applied, for example, to an image forming apparatus that scans a single photosensitive body with a plurality of laser beams and forms a one-color image.

Moreover, according to the embodiment, the optical scanning device 100 is described to be used in a printer; however, the present invention is also suitable for an image forming apparatus other than a printer, for example, a copy machine, a facsimile, or multifunction product in which such functions are integrally provided.

According to one aspect of the present invention, the holding member that holds the optical system, the splitting element, and the light receiving system is connected to the base member. With the light source aligned with the aligning unit provided on the base member, the positional relationship between the substrate on which the light source is mounted and the base member is defined by way of the supporting member. In this manner, the positional relationship among the optical system, the light receiving system, and the light source can be precisely defined without applying any load to the substrate, and stably maintained.

Furthermore, according to another aspect of the present invention, the optical scanning device includes the light source device according to the present invention. Therefore, a surface to be scanned can be precisely scanned over a long time period.

Moreover, according to still another aspect of the present invention, an image forming apparatus may be constructed according to the present invention. Therefore, an image can be formed precisely on a recording medium over a long time period.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
    a light source including a packaged light emitting element in which plural light emitting areas each emitting a laser beam in a predetermined axis direction are formed in a two-dimension array;
    a substrate that includes a first surface on which the light source is mounted;
    a beam-shaping optical system that shapes the laser beam emitted from each of the light emitting areas;
    a splitting element that splits a part of the laser beam passed through the beam-shaping optical system;
    a light receiving system that receives the laser beam split by the splitting element;
    a holding member that holds the optical system, the splitting element, and the light receiving system;
    a base member that is connected to the holding member, the base member including an aligning unit that aligns a position of the light source in a direction along an optical axis of the beam-shaping optical system and a direction perpendicular to the optical axis; and
    a supporting member that supports the substrate with respect to the base member with the light source being aligned with the aligning unit,
    wherein the aligning unit includes surfaces with which the light source makes contact in the optical axis direction and a direction perpendicular to the optical axis direction,
    the supporting member is connecting to the base member,
    the substrate is connected to the supporting member through annular members such that the substrate is connected to a first plane of the supporting member, the first plane being perpendicular to the optical axis, and the first plane of the supporting member is parallel to the substrate, and a surface of the first plane is in contact with a side of the substrate that faces the emitting direction of the laser beam, and wherein the supporting member has a second plane that is spaced apart from the first plane, the first plane of the supporting member being located between the substrate and the second plane,
    at a first one of circular openings, the substrate is fixed to the first plane of the supporting member through a first one of the annular members by screwing a first screw into the first circular opening to define a reference position of the substrate in the first plane of the supporting member, and wherein the substrate is located between the first annular member and the first plane of the holding member, and
    at a second of the circular openings, the substrate is fixed to the first plane of the supporting member through another one of the annular members by screwing a second screw into the second one of the circular openings, and wherein a space is formed between the another one of the annular members and the second screw so as to allow expansion and elongation of the substrate in the first plane of the supporting member, such that the aligning unit maintains alignment of the light source position during the expansion and elongation of the substrate in the first plane of the supporting member.

2. The light source device according to claim 1, wherein an annular member that is used as a reference is made of metal.

3. The light source device according to claim 1, wherein annular members other than the annular member used as the reference has a friction coefficient equal to or less than 0.05 with respect to the supporting member.

4. The light source device according to claim 2, wherein the screws inserted in the openings are stepped screws.

5. The light source device according to claim 1, wherein the aligning unit includes a first surface and second surfaces that have contacts with the light source to fix the light source, the first surface being perpendicular to the predetermined axis direction, and the second surfaces being parallel to the predetermined axis direction, wherein the light source device further comprises an elastic member that presses the light source against the first surface of the aligning unit by pressing the substrate against the base member.

6. An optical scanning device that scans a scanning surface in a main scanning direction using a laser beam, the optical scanning device comprising: the light source device of claim 1; and a scanning optical system that deflects laser beams emitted from the light source device to the main scanning direction for scanning.

7. An image forming apparatus that forms an image on a recording medium by fixing a toner image that is formed based on a latent image obtained from image information onto the recording medium, the image forming apparatus comprising: the optical scanning device of claim 6; a photosensitive element on which the optical scanning device forms the latent image; a developing unit that develops the latent image formed on the photosensitive element with toner to obtain a toner image; and a transferring unit that transfers and fixes the toner image onto the recording medium.

* * * * *